United States Patent [19]

Kimura et al.

[11] 4,426,972

[45] Jan. 24, 1984

[54] VIBRATION SUPPRESSION SYSTEM FOR DIESEL ENGINE

[75] Inventors: Akira Kimura, Zushi; Toshiro Abe, Yokohama, both of Japan

[73] Assignee: Nissan Motor Co., Ltd., Yokohama, Japan

[21] Appl. No.: 477,602

[22] Filed: Mar. 22, 1983

[30] Foreign Application Priority Data

Mar. 26, 1982 [JP] Japan ................................ 57-48388

[51] Int. Cl.³ .............................................. F02D 1/04
[52] U.S. Cl. .................................... 123/378; 123/376; 123/549; 123/552; 123/556
[58] Field of Search ............... 123/556, 549, 552, 378, 123/389, 350, 376

[56] References Cited

U.S. PATENT DOCUMENTS

| | | | |
|---|---|---|---|
| 2,139,777 | 12/1938 | Skok | 123/549 |
| 2,381,131 | 8/1945 | Mallory | 123/389 |
| 2,414,296 | 1/1947 | Gill | 123/556 |
| 2,664,868 | 1/1954 | Lautzenhiser | 123/378 |
| 4,058,101 | 11/1977 | Taira | 123/556 |
| 4,345,465 | 10/1982 | Takeuchi | 123/389 |
| 4,391,246 | 7/1983 | Kawabata | 123/370 |

Primary Examiner—Ronald H. Lazarus
Attorney, Agent, or Firm—Schwartz, Jeffery, Schwaab, Mack, Blumenthal & Koch

[57] ABSTRACT

A vibration suppression system for a diesel engine, comprises a device for decreasing the amount of intake air to be inducted into the engine when operated. A heating device is provided to heat the intake air when operated. A first detecting device is provided to detect a low engine speed and low engine load operating range of the engine, to produce a first signal in response thereto. A second detecting device is provided to detect the level of vibrational acceleration of engine vibration having frequencies within a predetermined range, and to produce a second signal in response thereto. First and second control devices are provided respectively operate the intake air amount decreasing device in response to the first signal and the heating device in response to the second signal, thereby throttling intake air in the low engine speed and low engine load operating range while heating intake air when the vibration acceleration level is outside a predetermined allowable range.

12 Claims, 3 Drawing Figures

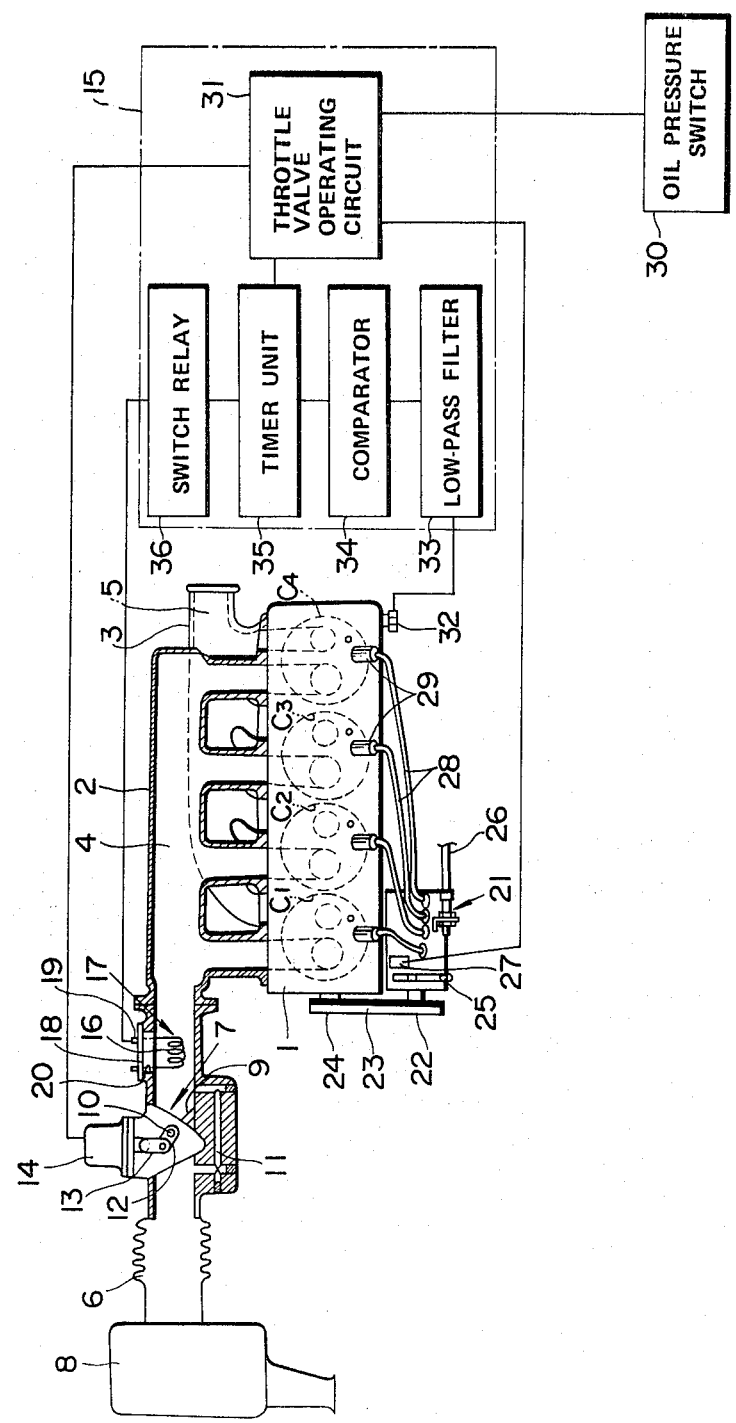

VIBRATION SUPPRESSION SYSTEM FOR DIESEL ENGINE

BACKGROUND OF THE INVENTION

1. Field of the Invention

This invention relates generally to an improvement in a diesel engine, and more particularly to a system for suppressing the vibration of the diesel engine.

2. Description of the Prior Art

In general, diesel engines employ so-called compression ignition and are two to three times higher in compression ratio than spark ignition engines such as gasoline or petrol fueled engines. Accordingly, the work done during compression stroke becomes much greater, thereby causing torque fluctuation and engine speed fluctuation. This tendency is conspicuous particularly at engine idling, constituting a cause for increasing engine vibration. In addition, since the diesel engine is usually not provided with an intake air throttle valve, intake air noise is released out without being damped. The thus released noise is offensive to the ear particularly at idling in which the level of the other noise is relatively low.

SUMMARY OF THE INVENTION

A vibration suppression system of a diesel engine, according to the present invention, comprises a device for decreasing the amount of intake air to be inducted into the engine when operated. A heating device is provided to heat the intake air when operated. A first detecting device is provided to detect a low engine speed and low engine load operating range of the engine, to produce a first signal in response thereto. A second detecting device is provided to detect the level of vibrational acceleration of engine vibration having frequencies within a predetermined range, and to produce a second signal in response thereto. A first control device is provided to operate the intake air amount decreasing device in response to the first signal from the first detecting device. Additionally, a second control device is provided to operate the heating device in response to the second signal from the second detecting device. Accordingly, intake air is throttled in the low engine speed and low engine load operating range including idling while heating intake air when the vibrational acceleration level is outside a predetermined allowable range. Consequently, the work for compression is decreased to suppress engine speed fluctuation and torque fluctuation while avoiding irregular combustion and misfire, thereby greatly reducing engine vibration and noise without deteriorating the stability of engine operation.

BRIEF DESCRIPTION OF THE DRAWINGS

The features and advantages of the vibration suppression system according to the present invention will be more appreciated from the following description taken in conjunction with the accompanying drawings, and in which:

FIG. 1 is a plan view partly in section of a diesel engine provided with a preferred embodiment of a vibration suppression system in accordance with the present invention;

DETAILED DESCRIPTION OF THE INVENTION

Figure 2A:
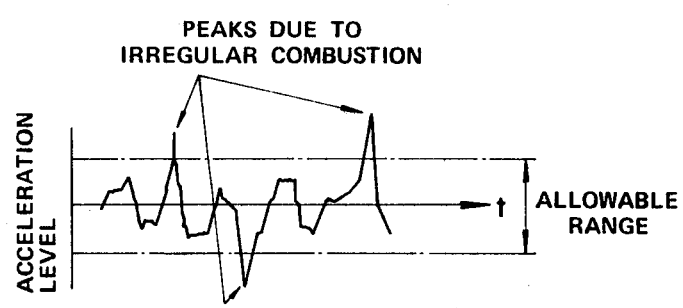
FIG. 2A is a graph showing the wave form of engine vibration.

Referring now to FIG. 1, there is a preferred embodiment of a noise suppression system for a four-cylinder type diesel or compression ignition engine, in accordance with the present invention. The diesel engine comprises an engine proper 1 which is provided with an intake manifold 2 and an exhaust manifold 3. The intake manifold 2 defines thereinside a part of an intake air passageway 4 through which atmospheric air (intake air) is inducted into the combustion chambers (no numerals) which are respectively defined in cylinders $C_1$, $C_2$, $C_3$ and $C_4$ of the engine proper 1. The exhaust manifold 3 defines therein a part of an exhaust gas passageway 5 through which exhaust gas from the combustion chambers is discharged out of the engine proper 1. An air filter 8 is connected through a duct 6 to the upstream side of the intake manifold 2. A throttle chamber 7 is interposed between the duct 6 and the intake manifold 2 and forms part of the intake air passageway 4. An intake air throttle valve or butterfly valve 9 is disposed within the throttle chamber 7 and fixedly mounted on a rotatable valve shaft 10 which is rotatably supported through the wall of the throttle chamber 7, so that the throttle valve is pivotally rotatable within the throttle chamber 7 or within the intake air passageway 4. Additionally, an auxiliary air passage 11 is so formed as to bypass the throttle valve 9.

As shown, the valve shaft 10 is mechanically connected through a throttle lever 12 and a link 13 to a movable rod (not shown) of a solenoid actuator 14, so that the throttle valve 9 is fully closed when an solenoid (not shown) of the actuator 14 is energized in response to an electric signal from a control circuit 15 which will be discussed after. In this case, the effective passage area of the auxiliary air passage 11 is so set as to obtain a predetermined small amount of intake air to be supplied to the combustion chambers when the throttle valve 9 is fully closed, i.e., obtain a predetermined high level of vacuum prevailing in the intake air passageway 4 downstream of the throttle valve 9.

A sheathed heater 16 is disposed within the intake air passageway 4 downstream of the throttle valve 9 and the auxiliary air passage 11, forming a means 17 for heating intake air or combustion air. The sheathed heater 16 is fixedly installed on a base member 18 in a manner that the terminals 19 of the heater 16 project outside the base member 18. The base member 18 is so formed as to fit in an installation opening 20, so that the base member 18 and the sheathed heater 16 constitute a single unit. The sheathed heater 16 is arranged to be supplied with electric current so as to heat the intake air to be supplied to the combustion chambers in response to an electric signal from the control circuit 15 when the throttle valve 9 is fully closed under a condition as discussed hereinafter.

A fuel injection pump 21 includes a pump pulley 22 which is operatively connected through a cogged belt 23 with a crank pulley 24 of the engine proper 1, and consequently the fuel injection pump 21 is arranged to be driven in timed relation to the engine revolution. A fuel control lever 25 of the fuel injection pump 21 is mechanically connected through an acceleration wire 26 to an acceleration pedal (not shown). An idle detecting switch (engine load detecting switch) 27 is disposed side by side with an idle adjustment screw (not shown) for setting an idle position or a predetermined small angular (slightly open) position of the fuel control lever 25 which angular position causes the engine to operate at idling. The idle detecting switch 27 is so arranged as to be switched ON when the fuel control lever 25 is at the predetermined small angular position. The idle detecting switch 27 serves to detect engine load and of the type of a microswitch. High pressure fuel from the fuel injection pump 21 is supplied under pressure via pipings 28 to fuel injectors 29 at a timing in the vicinity of top dead center at compression stroke. Each fuel injector 29 is disposed in the combustion chamber (or turbulence chamber) of each engine cylinder $C_1$, $C_2$, $C_3$ or $C_4$.

An oil pressure switch 30 is provided to detect the pressure of engine lubricating oil supplied from an oil pump (not shown) which is driven in timed relation to engine revolution. The oil pressure switch 30 has a first contact (not shown) which is closed when the engine lubricating oil pressure is at a first level $P_1$ or higher, and a second contact (not shown) which is closed when the engine lubricating oil pressure is at a second level $P_2$ or lower, the second level engine lubricating oil pressure $P_2$ being higher than the first level engine lubrication oil pressure $P_1$. These two contacts are connected in series with each other and therefore the oil pressure switch 30 as a whole is so arranged as to be switched ON when the lubricating oil pressure is between the levels $P_1$ and $P_2$. It will be understood that such a predetermined lower oil pressure range between the oil pressure levels $P_1$ and $P_2$ corresponds to a low engine speed range (between two engine speed levels) including engine speeds for idling. Thus, the oil pressure switch 30 can detect a low engine speed operating condition including idling. ON and OFF signals from the idle detecting switch 27 and the oil pressure switch 30 are supplied to a throttle valve operating circuit 31 in the control circuit 15. The throttle valve operating circuit 31 is so arranged as to energize the solenoid of the actuator 14 so that the throttle valve 9 is fully closed when both the idle detecting switch 27 and the oil pressure switch 30 are switched ON, i.e., at the low engine speed and low engine load operating range of the engine.

Figure 2B:
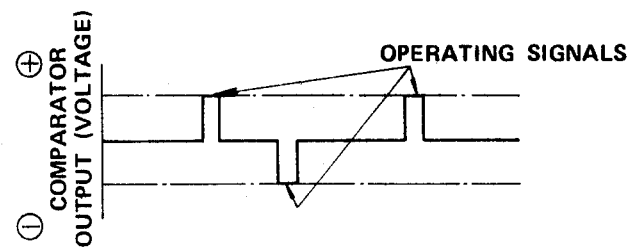
FIG. 2B is a graph showing operating signals fed from a comparator of the vibration suppression system when the engine vibration is outside an allowable range of FIG. 2A.

Additionally, an acceleration pickup 32 is disposed at the outer surface of the engine proper 1 in order to detect the vibrational acceleration of the engine proper 1 and to generate a signal in response thereto. The signal from the acceleration pickup 32 is supplied to a low-pass filter 33 which is arranged to select harmonics of vibration within a predetermined frequency range. Now, for example, a four cylinder engine has two explosion (compression) strokes per each engine revolution, vibrating the engine one time at each explosion stroke, which constitutes a so-called 2nd harmonics of vibration. In this connection, if a misfire occurs in one of four cylinders, 0.5th harmonics increases. The low-pass filter 33 is, in this case, so arranged to select the 0.5th harmonics, more specifically to allow to pass therethrough the signal (from the acceleration pickup 32) of a vibrational frequency lower than a predetermined vibrational frequency level (engine speed ×2/the number of cylinders) and to remove the signal of a vibrational frequency higher than the predetermined vibrational frequency. The output signal (corresponding to 0.5th harmonics) from the low-pass filter 33 is fed to a comparator 34 which is arranged to provide a timer unit 35 with operating signals as shown in FIG. 2B when the level of vibrational acceleration of the harmonics as the signal becomes outside a predetermined allowable range as shown in FIG. 2A. Upon receiving this operating signal from the comparator 34, the timer unit 35 makes a heater switch relay 36 conductive, so that electric current is passed through the sheathed heater 16 to heat intake air to be inducted into the combustion chambers of the engine. It is to be noted that the timer unit 35 is electrically connected to the throttle valve operating circuit 31 and operates in response to a command signal from the throttle valve operating circuit 31 so as to be operable only when the throttle valve 8 is fully closed. In other words, the sheathed heater 16 can generate heat only when the throttle valve is fully closed.

The manner of operation of the thus arranged system will be discussed hereinafter.

When the fuel control lever 25 of the fuel injection pump 21 is at the position other than at the predetermined small angular (slightly opened) position representing engine idling, or engine lubricating oil pressure is outside of the predetermined lower oil pressure range (i.e., higher or lower than the range between the levels of $P_1$ and $P_2$) even under the predetermined small angular position of the fuel control lever 25, the idle detecting switch 27 and/or the oil pressure detecting switch 30 is switched OFF, so that the solenoid of the actuator 14 is not energized. Thus, at engine operating ranges other than a low engine speed and low engine load operating range, the throttle valve 9 is fully opened. As a result, the engine can operate like a usual diesel engine which is not provided with the vibration suppression system according to the present invention, thereby obtaining a sufficient charging efficiency of intake air.

Conversely, at the low engine speed and low engine load operating range such as engine idling, the idle (load) detecting switch 27 and the oil pressure switch 30 are switch ON, and consequently the throttle valve 9 is fully closed under the action of the throttle valve operating circuit 31. Accordingly, intake air is inducted into the combustion chambers through the auxiliary air passage 11, and therefore the amount of the intake air is controlled to a small value. By virtue of the thus throttled intake air, the compression pressure within the combustion chamber is relatively lowered as compared with in a conventional case where intake air throttling is not carried out. Particularly, the work done at compression stroke is decreased by an amount corresponding to lowered peak pressure, thereby suppressing engine speed fluctuation and torque fluctuation. This greatly lowers the vibrational force of the engine proper 1, thereby reducing engine vibration (mainly of the 2nd harmonics).

It will be understood that since fuel injection amount is less at idling so that air-fuel mixture is excess in air, a sufficient intake air amount can be attained even upon such intake air throttling. The thus lowered compression pressure due to throttling intake air lowers intake air temperature, so that it seems to become liable to cause unstable ignition of injected fuel and irregular combustion. This arises the above-mentioned 0.5th harmonics, thereby causing a possibility to increase unpleasant vibrations.

In this regard, the vibration of the engine proper 1 is detected by the acceleration pickup 32 and the 0.5th harmonics is selected by the low-pass filter 33. The level of vibrational acceleration of the thus selected harmonics of vibration is compared with the predetermined allowable range. When the vibrational acceleration level is outside the predetermined allowable range, the timer unit 35 is operated to, in turn, operate the heater switch relay 36, so that electric current is passed through the sheathed heater 16 as the heating means 17 by a predetermined time duration thereby to heat the intake air inducted into the combustion chambers of the engine. As a result, the temperature of the intake air becomes relatively high so that the lowered amount due to the lowered compression pressure can be compensated. Consequently, although the compression pressure is lowered, the stability of combustion is highly maintained, thereby avoiding vibration fluctuation and torque fluctuation due to misfire, irregular combustion and the like.

Thus, according to the present invention, compression pressure is lowered by throttling intake air in order to lower the inherent vibration level of the engine. Additionally, combustion within the combustion chambers are maintained in a good condition by heating intake air in response to the vibrational level within a particular frequency range. These effectively suppress the generation of unpleasant vibrations due to irregular combustion and the like. Furthermore, since the intake air throttle valve 9 is fully closed at idling, intake air is damped, thereby achieving total reduction of engine noise and vibration.

It is preferable that the intake air throttling and the intake air heating are not carried out at engine deceleration or engine cranking even in a low load engine operating range, or at engine acceleration during vehicle starting even in a low engine speed operating range. This is because: at the engine deceleration, it is desirable to increase the work for compression in order to improve the effect of engine brake; at the engine cranking, it is required to raise the compression pressure in order to facilitate engine starting; and at the vehicle starting, a greater acceleration torque is required.

While only the sheathed heater 16 has been shown and described as the heating means 17 for intake air, it will be understood that the heating means may be or include a glow plug disposed in the combustion chamber of the engine.

As appreciated from the above, according to the present invention, intake air is throttled in the low engine speed and low load engine operating range including idling condition, while heating intake air when the vibrational acceleration level is outside the predetermined allowable range. Accordingly, compression work is decreased to suppress engine speed fluctuation and torque fluctuation while avoiding irregular combustion and misfire, thereby greatly reducing engine vibration and noise without deteriorating the stability of engine operation.

What is claimed is:

1. A system for suppressing vibration of a diesel engine, comprising:
    means for decreasing the amount of intake air to be inducted into the engine when operated;
    means for heating the intake air when operated;
    first detecting means for detecting a low engine speed and low engine load operating range of the engine, and for producing a first signal in response thereto;
    second detecting means for detecting the level of vibrational acceleration of engine vibration having frequencies within a predetermined range, and for producing a second signal in response thereto;
    first control means for operating said intake air amount decreasing means in response to said first signal from said detecting means; and
    second control means for operating said heating means in response to said second signal from said second detecting means.

2. A system as claimed in claim 1, further comprising means for causing said heating means to operate only when said intake air amount decreasing means is operated.

3. A system as claimed in claim 2, wherein said intake air amount decreasing means includes
    means defining an intake air passageway leading to the combustion chamber of the engine,
    an intake air throttle valve movably disposed within said intake air passageway,
    a throttle valve actuator for fully closing said throttle valve when operated in response to said first signal from said first detecting means, and
    means defining an auxiliary air passage communicating with said intake air passageway and bypassing said throttle valve.

4. A system as claimed in claim 3, wherein said first detecting means includes an engine speed responsive means for sensing an engine operating parameter corresponding to engine speed, and an engine load responsive means for sensing an engine operating parameter corresponding to engine load.

5. A system as claimed in claim 4, wherein said first control means includes a throttle valve operating circuit operatively connected to said engine speed responsive means and to said engine load responsive means, and operatively connected to said throttle valve actuator.

6. A system as claimed in claim 5, wherein said throttle valve actuator is a solenoid actuator constructed and arranged to fully close said throttle valve when supplied with electric current.

7. A system as claimed in claim 6, wherein said engine speed responsive means includes an oil pressure switch operative in response to the pressure of engine lubricating oil, said oil pressure switch being electrically connected to said throttle valve operating circuit which is arranged to allow electric current to pass through said throttle valve actuator when the pressure of the engine lubricating oil is between first and second levels.

8. A system as claimed in claim 7, wherein said engine load responsive means includes an idle detecting switch operative in response to the movement of a fuel control member for controlling the amount of fuel to be supplied to the combustion chamber, said idle detecting switch being electrically connected to said throttle valve operating circuit which is constructed and arranged to allow electric current to pass through said throttle valve actuator when said fuel control lever is at a position corresponding to engine idling.

9. A system as claimed in claim 4, wherein said intake heating means includes an electric heater for generating heat when supplied with electric current.

10. A system as claimed in claim 9, wherein said second detecting means includes an acceleration pickup for sensing the acceleration level of the engine vibration.

11. A system as claimed in claim 10, wherein said second control means includes a heater operating circuit which electrically interconnects said electric heater and said acceleration pickup, said heater operating circuit being constructed and arranged to cause electric current to pass through said electric heater when the vibrational acceleration level is outside a predetermined allowable range.

12. A system as claimed in claim 11, wherein said electric heater is a sheathed heater located in said intake air passageway downstream of said auxiliary air passage and upstream of the combustion chamber.

* * * * *